Patented June 26, 1951

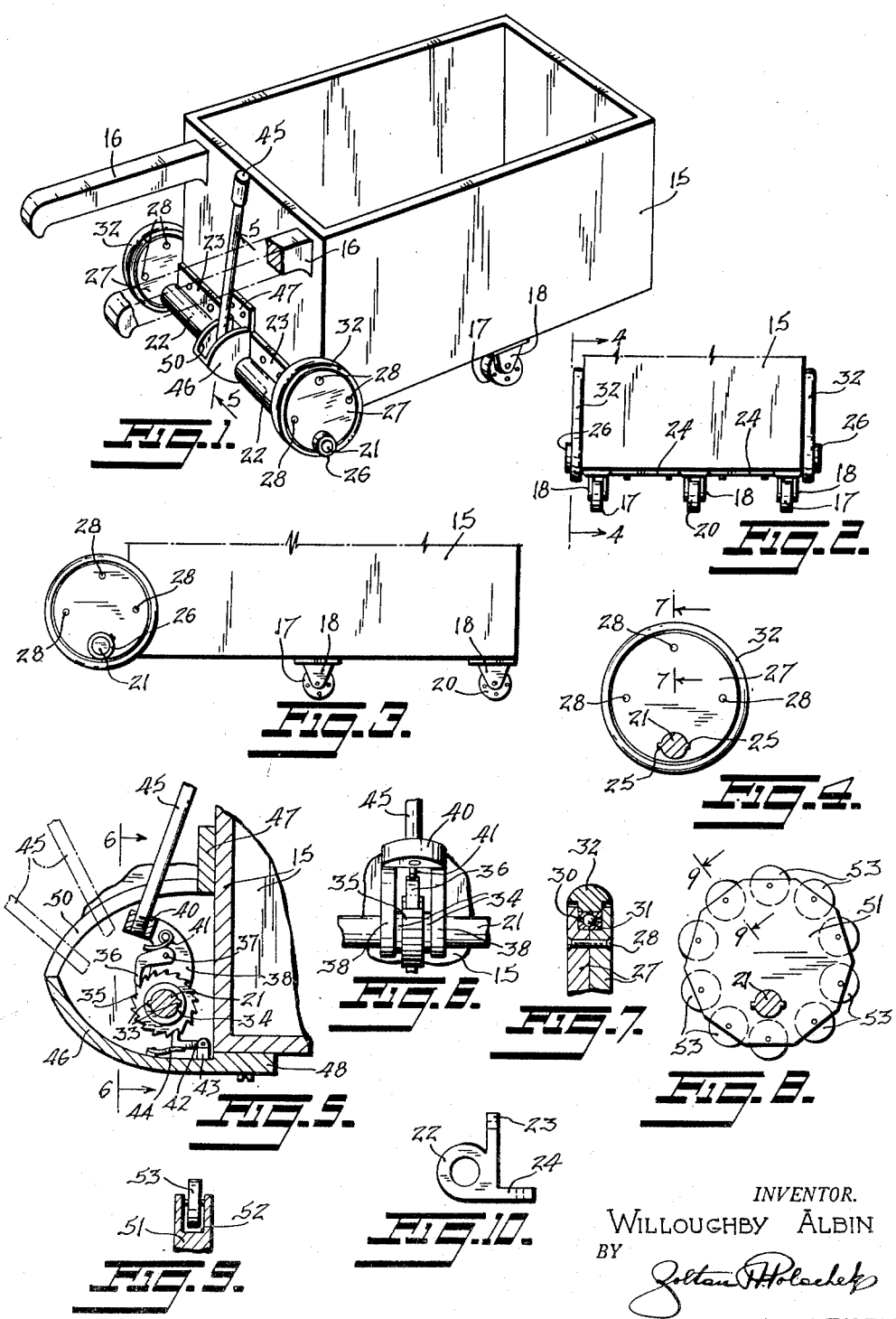

2,558,330

UNITED STATES PATENT OFFICE 2,558,330

LIFTING JACK FOR HAND TRUCKS

Willoughby Albin, New York, N. Y.

Application February 28, 1950, Serial No. 146,724

7 Claims. (Cl. 280—5.3)

This invention relates to a new and useful improvement in hand trucks.

It is the practice in certain city business districts to ship merchandise from the place of manufacture to a warehouse or salesroom, often a distance of only one or two blocks, in a hand truck. These hand trucks are of a wide variety of types, but perhaps the most common are those comprising an open topped box having a pair of wheels disposed midway of its length, one at each side, and a center wheel at one end. This center wheel facilitates moving the truck from the roadway, over the curbstone onto the sidewalk. In this maneuver the truck is tipped raising said center wheel to a height above that of the curbstone, the truck pushed forward and said wheel allowed to descend on the sidewalk. Then the rear end of the truck is lifted to bring the medial side wheels onto the sidewalk.

Other trucks differ from this type in that the wheels are arranged differently or in that more wheels are provided, but all are designed to be tipped to raise the front wheel or wheels onto the sidewalk.

The fault with these trucks is that when a heavy load of merchandise is being transported therein, it is almost impossible for the operator to lift the rear end thereof sufficiently for the medial side wheels to clear the curbstone.

The principal object of the invention is to provide means for facilitating the lifting of the rear ends of such trucks.

Another object of the invention is so to construct said means as to provide for its application to existing trucks.

Still another object of the invention is so to construct said means as to provide for the rapid and efficient operation thereof with a minimum of exertion by the operator.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a hand truck embodying the means of the invention.

Fig. 2 is a fragmentary front view of the hand truck.

Fig. 3 is a fragmentary side view of the hand truck.

Fig. 4 is an enlarged elevation of an eccentric wheel of the invention.

Fig. 5 is an enlarged, fragmentary sectional view on line 5—5 of Fig. 1.

Fig. 6 is an enlarged fragmentary detail view of a portion of the mechanism.

Fig. 7 is an enlarged, fragmentary sectional view on line 7—7 of Fig. 4.

Fig. 8 is an elevation of a modified form of the eccentric wheel.

Fig. 9 is a sectional view on line 9—9 of Fig. 8.

Fig. 10 is a detail side view of a part of the mechanism shown also in Fig. 1.

Referring to Fig. 1, the invention is illustrated as applied to a hand truck having a box like body 15 from the rear of which project a pair of handles 16. Midway of its length the truck is provided with side wheels 17 suitably journalled in brackets 18; and at its front end it is provided with a center wheel 20 also journalled in a bracket 18 (see also Figs. 2 and 3).

This truck is pushed along by means of the handles 16, and when it is desired to move the truck from the roadway to the side walk the operator leans on the handles 16 to raise the wheel 20 over the curbstone. In order that the operator does not have to lift the truck bodily to raise the wheels 17, 18 over the curbstone the following means are provided.

A shaft 21, Fig. 1, is journalled in a pair of brackets 22 each having an upturned flange 23 secured to the rear wall of the body 15 and a horizontal flange 24, Fig. 10, secured to the floor of the body 15. At either end, outside of body 15, the shaft has secured thereon by splines 25 (Fig. 4) and a collar 26 (Figs. 1, 2 and 3) an eccentric 27. As shown in Fig. 7 the eccentric 27 is made in two layers secured together by rivets 28, the assembled eccentric having a peripheral groove 30 in which is mounted a ball bearing ring 31 on which is journalled a strap or tire 32. At its midpoint the shaft 21 has secured thereon by splines 33 (Fig. 5) and collars 34 (Fig. 6) a ratchet wheel 35 which has cooperating therewith a feed pawl 36 pivoted on a pin 37 carried between the arms 38 of a bifurcated feed member 40. The arms 38 loosely embrace the shaft 21 and a leaf spring 41 is provided to retain the pawl 36 in engagement with the ratchet wheel. A detent pawl 42 pivoted in a bracket 43 and held in engagement with the ratchet wheel by a spring 44 is provided for maintaining shaft 21 in the angular position to which it is advanced by the feed pawl 36. For advancing the pawl 36, an upwardly extending lever 45 is provided. The latter has its lower end threaded into a hole in the feed member 40 (Fig.

5). All of the feed mechanism is enclosed in a housing 46, having flanges 47 and 48 secured to the wall and the floor respectively of the body 15 and having also a slot 50 (Fig. 1), to permit swinging movements of the lever 45.

The construction is such that the eccentrics 27 are normally in the position shown in the drawings with the lower edges thereof substantially in alignment with the lower edge of body 15, and are in this position when the truck is tipped to elevate the front wheel 20 (Fig. 3) over a curbstone. With the front wheel 20 on the side walk and the wheels 17 against or close to the curbstone, the tires 32 on eccentrics 27 are in engagement with the roadway. To lift the wheels 17 over the curbstone the lever 45 is pulled outward and downward as shown in dot dash lines in Fig. 5, which through feed pawl 36 and ratchet wheel 35 rotates shaft 21. Rotation of the shaft causes the eccentrics 27 to rotate within their tires 32, lifting the truck. The lever 45 is reciprocated once, twice or as many times as are necessary to cause rotation of the eccentrics sufficient for the wheels 17 to be raised above the curbstone. When the truck has been raised sufficiently it is rolled forward to place the wheels 17 on the side walk, the tires 32 rotating on the eccentrics 27.

Once the wheels 17 are above the side walk the lever 45 is operated to advance the eccentrics 27 to their initial position and the truck is pushed along on the side walk.

In a modified form of the invention the eccentrics 27 are replaced by multiedged members 51, eccentrically fixed on shaft 21. Each edge of each member 51 is provided with a slot 52 in which is pivoted a wheel 53 of a size sufficient for a line tangent to two adjacent wheels to clear the corners of the member.

The modified eccentrics 51 operate in the same manner as described hereinbefore, the wheels 53 rolling on the roadway in place of the tires 32.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. The combination with a hand truck comprising a box like body having one or more front wheels and a pair of wheels midway of the length thereof, of a shaft supported on the rear wall of the box, an eccentric secured on either end of said shaft, the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a hand lever secured to said feed member for advancement thereof, a detent pawl for said wheel and means mounted on each said eccentric for rotation independently thereof.

2. The combination with a hand truck comprising a box like body having one or more front wheels and a pair of wheels midway of the length thereof, of a shaft supported on the rear wall of the box, an eccentric secured on either end of said shaft, the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a spring to hold the pawl in engagement with the wheel, a hand lever secured to said feed member for advancement thereof, a detent pawl for said wheel, a spring to hold the pawl in engagement with the wheel, and means mounted on each said eccentric for rotation independently thereof.

3. The combination with a hand truck comprising a box like body having one or more front wheels and a pair of wheels midway of the length thereof, of a shaft supported on the rear wall of the box, an eccentric secured on either end of said shaft, the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a spring to hold the pawl in engagement with the wheel, a hand lever secured to said feed member for advancement thereof, to rotate the shaft and the eccentrics and raise the rear end of the truck, a detent pawl for said wheel a spring to hold the pawl in engagement with the wheel, and means mounted on each said eccentric for rotation independently thereof.

4. The combination with a hand truck comprising a box like body having one or more front wheels and a pair of wheels midway of the length thereof, of a shaft supported on the rear wall of the box, an eccentric secured on either end of said shaft the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a spring to hold the pawl in engagement with the wheel, a hand lever secured to said feed member for advancement thereof, to rotate the shaft and the eccentrics and raise the rear end of the truck, a detent pawl for said wheel, an annular groove in the periphery of each said eccentric, a bearing ring mounted in each said groove, and a tire journalled on each said ring for rotation independently of the eccentric.

5. The combination with a hand truck comprising a box like body having one or more front wheels and a pair of wheels midway of the length thereof, of a shaft supported on the rear wall of the box, an eccentric secured on either end of said shaft, the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a spring to hold the pawl in engagement with the wheel, a hand lever secured to said feed member for advancement thereof, to rotate the shaft and the eccentrics and raise the rear end of the truck, a detent pawl for said wheel, each said eccentric comprising a multiedged member eccentrically mounted on the shaft and having a notch in each edge and a wheel journalled in each said notch, said edges and wheels being so proportioned that a line tangent to two adjacent wheels clears the corner of the associated edges.

6. The combination with a hand truck comprising a box like body having one or more front wheels and a pair of wheels midway of the length thereof, of a shaft supported on the rear wall of the box, an eccentric secured on either end of said shaft, the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a hand lever secured to said feed member for advancement thereof, a detent pawl for said wheel and means mounted on each said eccentric for rotation independently thereof, an annular groove in the periphery of each said eccentric, a bearing ring mounted in each said groove, and a tire journalled on each said ring for rotation independently of the eccentric.

7. The combination with a hand truck comprising a box like body having one or more front wheels and a pair of wheels midway of the length thereof, of a shaft supported on the rear wall of the box, an eccentric secured on either end of said shaft, the lower ends thereof being substantially in alignment with the bottom of the box, a ratchet wheel secured on the shaft at its midpoint, a bifurcated feed member loosely mounted on the shaft on either side of said ratchet wheel, a feed pawl pivoted to said member, a hand lever secured to said feed member for advancement thereof, a detent pawl for said wheel and means mounted on each said eccentric for rotation independently thereof, each said eccentric comprising a multiedged member eccentrically mounted on the shaft and having a notch in each edge and a wheel journalled in each said notch, said edges and wheels being so proportioned that a line tangent to two adjacent wheels clears the corner of the associated edges.

WILLOUGHBY ALBIN.

REFERENCES CITED

The following references are of record in the file of this patent:

UNITED STATES PATENTS

| Number | Name | Date |
| --- | --- | --- |
| 1,911,924 | Powers | May 30, 1933 |
| 2,116,825 | Crescent et al. | May 10, 1938 |

FOREIGN PATENTS

| Number | Country | Date |
| --- | --- | --- |
| 577,797 | Germany | June 3, 1933 |
| 620,857 | Germany | Oct. 28, 1935 |